Oct. 6, 1953 W. T. REA 2,654,878

CATHODE-RAY TRANSLATING SYSTEM FOR PERMUTATION CODES

Original Filed Aug. 29, 1944 3 Sheets-Sheet 1

INVENTOR
W. T. REA
BY
R. C. Berry
ATTORNEY

Oct. 6, 1953 W. T. REA 2,654,878

CATHODE-RAY TRANSLATING SYSTEM FOR PERMUTATION CODES

Original Filed Aug. 29, 1944 3 Sheets-Sheet 2

INVENTOR
W. T. REA
BY R. C. Lerry
ATTORNEY

Oct. 6, 1953 W. T. REA 2,654,878

CATHODE-RAY TRANSLATING SYSTEM FOR PERMUTATION CODES

Original Filed Aug. 29, 1944 3 Sheets-Sheet 3

INVENTOR
W. T. REA
BY R. C. Perry
ATTORNEY

Patented Oct. 6, 1953

2,654,878

UNITED STATES PATENT OFFICE 2,654,878

CATHODE-RAY TRANSLATING SYSTEM FOR PERMUTATION CODES

Wilton T. Rea, Manhasset, N. Y., assignor to Bell Telephone Laboratories, Incorporated, New York, N. Y., a corporation of New York Original application August 29, 1944, Serial No. 551,674, now Patent No. 2,458,030, dated January 4, 1949. Divided and this application December 4, 1948, Serial No. 63,597

16 Claims. (Cl. 340—165)

This invention relates to signaling apparatus and systems and more particularly to circuit selecting or decoding arrangements used in such systems.

This application is a division of copending application Serial No. 551,674, filed August 29, 1944, by W. T. Rea, which has issued as Patent 2,458,030 granted January 4, 1949.

It is an object of the invention to provide a circuit selecting or decoding arrangement in which the various code permutations are represented by distinct potential differences of sufficient magnitude to insure accurate discrimination in any one of the discriminating circuits in the system.

It is a more specific object to provide a type of circuit selecting system which may be effectively used in code signaling systems such as the message circuits in telegraph systems in which the coded message is to be interpreted.

In accordance with the invention the system includes a circuit selecting arrangement the main features of which are a code unit circuit for each unit of the code adapted to respond to the alternate characteristics of its assigned code unit, and code discriminating circuits for the combinations of the code or for the circuits to be selected or for the symbols which it is desired to translate from the code. Each code unit circuit has two output conductors one of which has a high potential and the other a comparatively low potential, under marking condition, these potentials being interchanged between the two conductors under spacing condition. Each code discriminating circuit includes a potential gradient network with a plurality of branches connected to the output conductors from the code unit circuits in accordance with the code requirements for the particular symbol represented by the code discriminating circuit. The arrangement of the potential gradient circuit is such that an intermediate control potential is established at an output terminal thereof which will have different distinct values in accordance with the different code combinations impressed upon the circuit by the code unit circuits. By this arrangement it is possible to select a particular potential for any code combination to which the code discriminating circuit should respond for selection or translation by impressing the potentials at the output terminal upon a sensitive discriminating device which is made selectively responsive thereto. For individual selection, as for the selection of a single symbol out of a plurality of symbols, either the maximum or the minimum potential established at the output terminal by a code combination may be used.

Further objects and features of the invention will appear from the following detailed description of specific embodiments of the invention.

In the following description reference will be made to the drawings in which.

Figure 1:
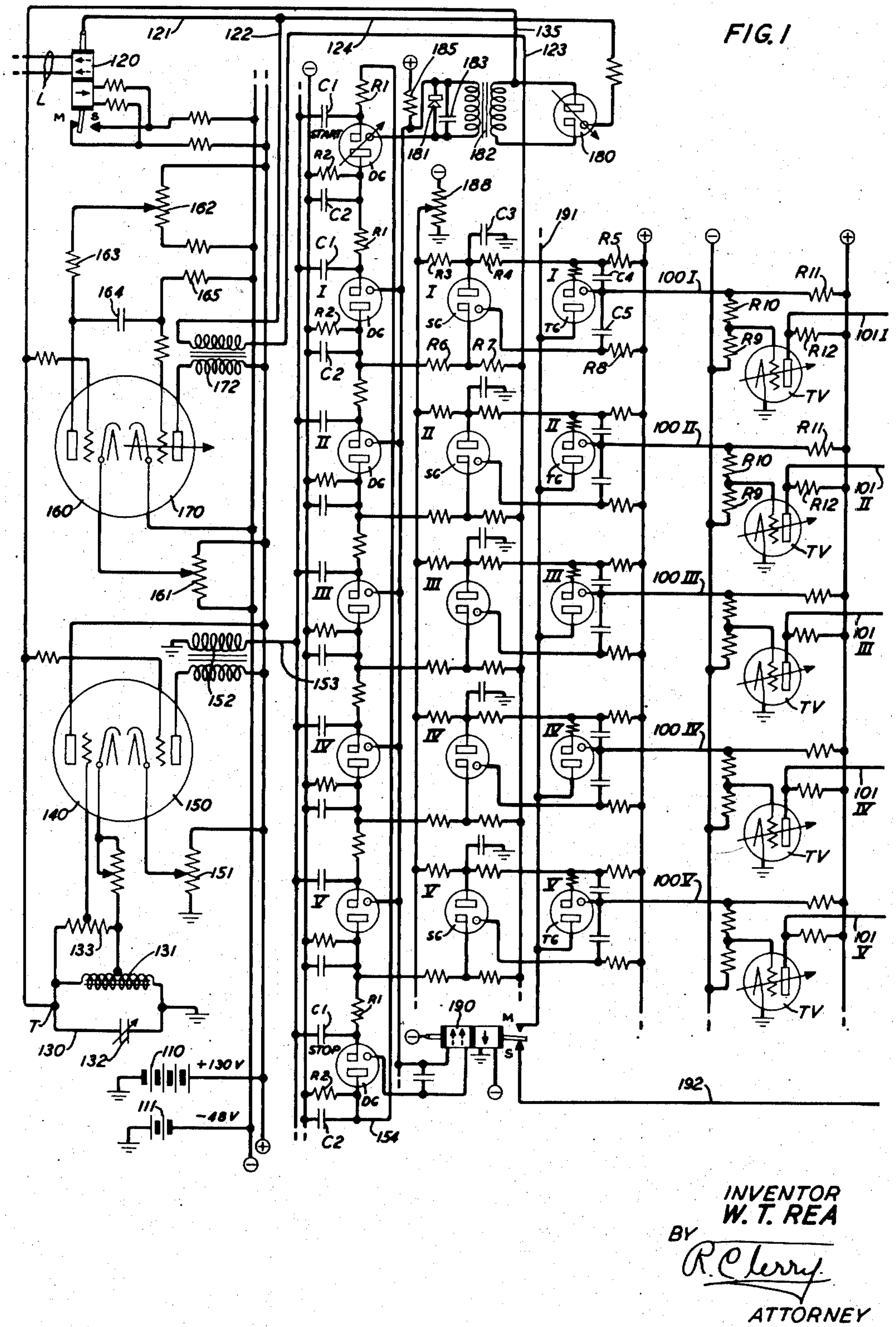
Fig. 1 shows a telegraph signal receiving system adapted for operation on a seven unit Start-Stop telegraph code for setting up the five selecting code units on five output conductors respectively.

The receiving circuit shown in Fig. 1 includes a receiving relay 120 having an upper winding connected to an incoming circuit L for receiving marking and spacing pulses. It will be assumed that the marking condition is established by current in the circuit L and the spacing condition by no current therein. The relay has a lower biasing winding continuously energized to hold the relay armature against the spacing contact when the upper winding is currentless. A marking current in the upper winding will be strong enough to overcome the biasing winding and operate the relay to marking. The relay 120 has a marking and a spacing contact connected to plus and minus potentials, respectively, for application to the circuit.

The system includes a grounded source of direct current 110 which applied +130 volts to parts of the system, and another grounded source of potential 111 applying a potential of −48 volts to other parts of the system. For the sake of simplicity, all conductors shown in Figs. 1 and 2 which are directly connected to the source 110 are terminated in a (+) symbol indicating that they are to be interconnected directly and all conductors connected directly to the source 111 are terminated in a (−) symbol indicating that they are to be directly interconnected.

The circuit in Fig. 1 includes an oscillatory circuit 130 and a vacuum tube 140 associated therewith for feedback to produce sustained oscillations. Other vacuum tubes 150, 160 and 170 are provided to apply impulses to other parts of the circuit in synchronism with the oscillations. These vacuum tubes, and other vacuum tubes used in the system and referred to hereinafter, may be of conventional type, each including the heated cathode or filament, the control element or grid and the anode or plate, mounted in a highly evacuated container or tube. With a substantially constant potential applied between the plate and the cathode, the current in the cathode-anode circuit is controlled by the potential difference between cathode and grid, becoming less as the grid becomes less positive or more negative with respect to the cathode. Thus for any particular tube there will be a certain critical grid potential at which the plate current is so small that for the purposes of the system the tube may be considered extinguished or non-conducting; at grid potentials above the critical value the tube may be considered fired or conducting.

The circuit further comprises an electronic distributor including a series of distributor gas-filled tubes DG, one of these tubes being associated with the Start pulse and another with the Stop pulse and the five intervening tubes DG being associated with the five significant or selecting pulses I, II, III, IV and V, respectively. The latter five tubes DG are each associated with a storing gas tube SG and a transfer gas tube TG. The gas-filled tubes DG, SG and TG, and other gas-filled tubes used in the system and referred to hereinafter, may be of conventional type, each including a narrow control gap between the cathode and the control anode and also including a main gap between the cathode and the main anode or plate. These elements are included in a sealed vessel or tube containing a suitable inert gas at low pressure. A comparatively high firing potential is required to break down the control gap for firing of the tube, and with a comparatively low sustaining potential applied to the main gap the discharge will automatically switch to the main gap. In order to extinguish the tube the firing potential and the potential across the main gap must be reduced below their sustaining values. From each of the transfer tubes TG an output conductor 100 is provided for impressing the stored combination upon other circuits. A relay 190 is arranged for operation during the Stop pulse and serves to control the transfer of the stored combinations into the circuit in Fig. 2 during the Stop pulse.

The circuit in Fig. 1 is shown in normal stop condition with relay 120 in marking position and relay 190 in spacing position.

The oscillatory circuit 130 and its associated feedback tube 140 and output tube 150 are particularly arranged for operation on a start-stop basis and for the production of short impulses evenly and accurately spaced apart in synchronism with the standard frequency of the telegraph signals received over the circuit L. Such a Start-Stop pulse producing circuit, substantially identical with that shown in Fig. 1 is disclosed in Patent 2,370,685 granted March 6, 1945, to W. T. Rea and J. R. Wilkerson.

The circuit 130 includes an inductance 131 divided into two closely coupled halves and a condenser 132. A potentiometer 133 is bridged across the left half of the inductance to apply oscillatory potential to the control grid of the vacuum tube 140; the cathode-anode circuit of tube 140 is connected across the right-hand of inductance 131 through plus battery and ground for energy feedback during each oscillation. The oscillatory circuit 130 is normally held cocked against oscillation by the application of plus potential over marking contact of relay 120, conductors 121 and 124, gas tube 180 and conductor 135 connected to the output terminal T of the oscillatory circuit; the gas tube 180 is normally in conducting condition. The circuit is so adjusted that under this condition a current flows through inductance 131 of the same magnitude as the maximum current flowing during oscillations.

Upon receipt of a Start pulse, which is a spacing pulse, relay 120 operates to spacing and opens the cocking circuit, just traced, thereby removing the pulse potential from the terminal T. The stored energy in inductance 131 now transfers to condenser 132 and a first cycle will be produced without any superimposed transients and the system continues to produce identical cycles until the arrival of the next Stop pulse when it will again be cocked over the marking contact of relay 120, the cocking circuit in the meantime having been kept open by the tube 180, as will be described hereinafter.

The oscillations are impressed upon the control grid of the output tube 150 which for certain values of the varying voltage applied to the grid becomes conducting and non-conducting, at each change producing a short impulse in the secondary winding of the transformer 152, which impulses are impressed upon the distributor circuit over conductor 153.

The oscillations are also impressed upon the grid of tube 160 which similarly becomes conducting and non-conducting at predetermined values of the oscillating potential. When the tube 160 is non-conducting the condenser 164 is charged from minus over resistances 165, 163 and to plus potential on the potentiometer 162. The moment the tube 160 becomes conducting the condenser 164 temporarily impresses a negative potential on the grid of the normally conducting tube 170 which thereby is temporarily extinguished. This shift of the condenser voltage is caused by the drop in potential over resistance 163 due to the rising plate current in tube 160; as condenser 164 discharges to the reduced potential the grid potential in tube 170 is restored to its former value and the tube again becomes conducting. When tube 160 is extinguished at a later instant of the cycle of oscillations, the drop over resistance 163 disappears and the condenser voltage is shifted toward plus, thereby making the grid of tube 170 more positive and temporarily increasing the plate current, without significant effect until the condenser resumes its new charge. Each time the tube 170 is rendered conducting or non-conducting an impulse is produced in the secondary of transformer 172 which is applied to the control anodes of storing gas tubes SG over a circuit from marking or spacing contact of relay 120, conductors 121 and 122, secondary winding of transformer 172 and conductor 123; the impulses from transformer 172 thus are superimposed upon the plus or minus potentials applied by relay 120 to the storing tubes.

In the following description of the operation of the different parts of the system shown in Fig.

Figure 4:
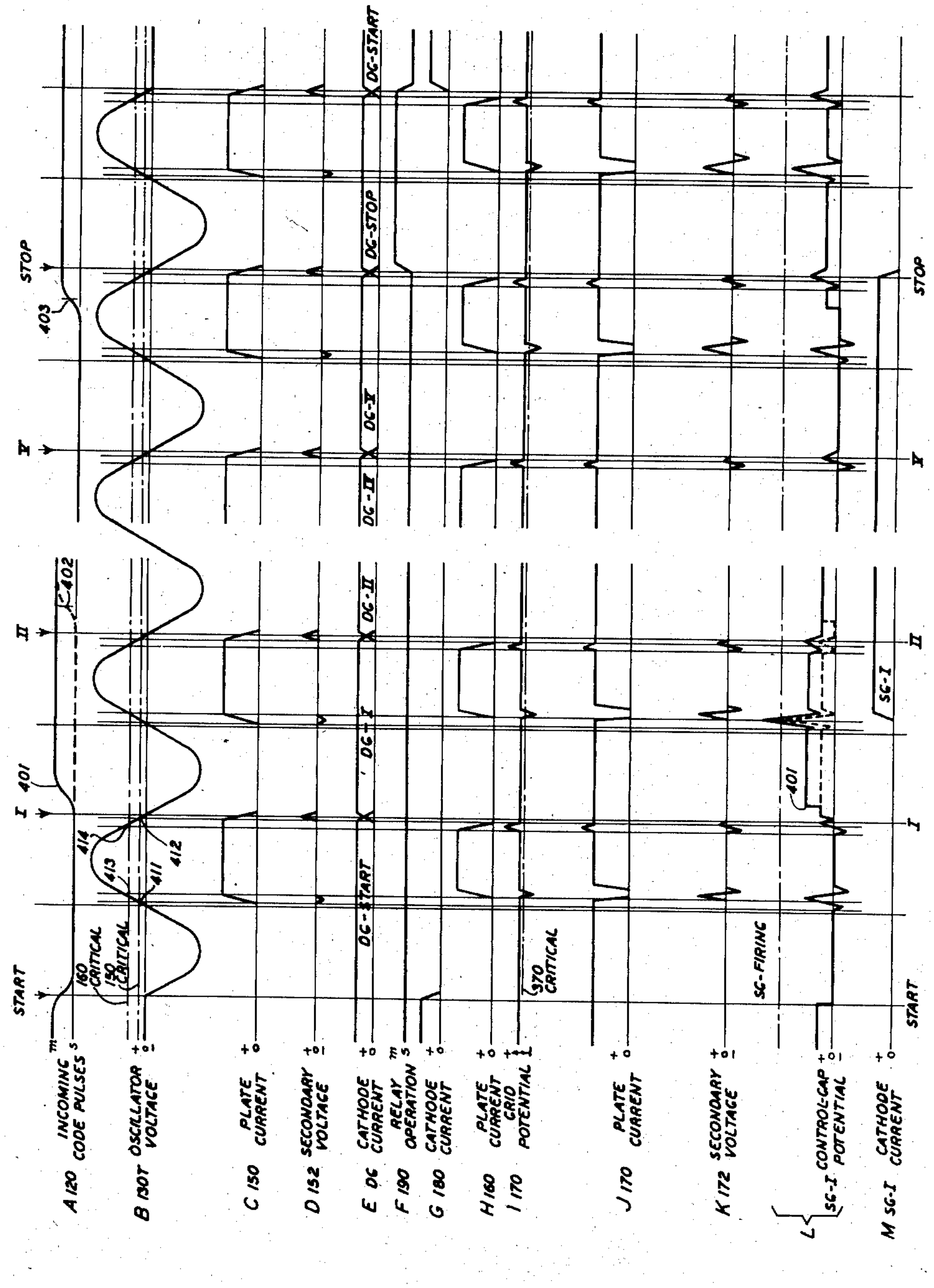
Fig. 4 is a diagram of operations for the system shown in Fig. 1.

1, reference will also be made to the diagram of operations shown in Fig. 4.

This diagram includes a set of horizontally disposed curves A to M representing corresponding functions occurring at different points of the system during the reception of a series of pulses of an incoming code signal. The code signal comprises the Start transition, the selecting or character transitions I, II, III, IV, V and the Stop transition and the arrival times of these transitions are indicated by correspondingly identified vertical lines extending across all of the curves, transitions III and IV having been omitted for simplification. The transition lines indicate the standard arrival times for the system in accurate relation to the arrival time of the Start impulse of the received signal and thus do not indicate bias or other distortion.

The curves C to M are not intended to show accurately the details of variations in currents or voltages, but merely serve to indicate the instants at which changes take place and the general nature of the changes.

Curve A shows the pulses of the signal incoming to relay 120. Thus normally a marking condition is received until the Start pulse operates the relay to spacing and thereby establishes the reference instant for the succeeding operations. The code will, for the sake of example, be assumed to be as follows: the Start pulse; selecting pulse I, which is marking and is delayed; pulses II and III, which are marking; pulses IV and V, which are spacing; and the Stop pulse which is assumed to arrive early. The relay 120 thus will operate from spacing to marking at the times 401 and 403 marked on the curve A.

Curve B shows the oscillating voltage at the terminal T of oscillator 130. During rest condition the potential at T will be slightly positive due to the resistance drop in inductance 131. Upon arrival of the Start transition the oscillator produces a series of seven substantially pure harmonic voltage oscillations, each odd half cycle being negative and each even half cycle being positive. The duration of each cycle equals the standard pulse period.

Curves C, H and J show the variation in plate current in tubes 150, 160 and 170, respectively, as controlled by the oscillations, and curves D and K show the corresponding voltage impulses produced in the secondary windings of transformers 152 and 172, respectively. The critical grid potential for tube 150 is shown in connection with curve B by the dot-dash line "150-critical," being more positive than the normal pulse potential at point T before the Start, so that the tube is normally nonconducting. At the time 411 during the positive half cycle and near the center of the Start pulse tube 150 becomes conducting, and at the time 412 near the end of the cycle the tube again becomes currentless. The critical potential may be changed by adjusting potentiometer 151. The critical grid potential of tube 160 is similarly shown with curve B by dot-dash line "160-critical" and thus the tube, being normally currentless, becomes conducting at the time 413 and currentless at time 414 during the positive half cycle. The variations in grid potential for tube 170 relative to the critical potential are shown in curve I.

For the purpose of orientation during operation the instants at which the tube 160 becomes non-conducting may be phased relative to the standard transition instants established by the oscillators circuit 130 by means of the potentiometers 161 and 162, the adjustable contacts of which may be ganged together for simultaneous adjustment, so that the cathode-anode potential may be kept constant, once adjusted, while it is shifted relative to the grid potential. Accordingly, the potential line "160-critical" may be shifted above or below the zero line for curve B, with the object of securing the best operation for any general bias or other distortion of the signals.

The operations referred to above as taking place at the instants 411, 412, 413 and 414 during the first cycle of oscillations will, of course, be repeated at corresponding instants during each succeeding cycle.

Curve E shows the times of current flow in or firing of each of the distributor gas tubes DG. The tube DG-Start is normally fired.

Curve F shows the operation of transfer relay 190 to marking during the Stop pulse.

Curve G shows the firing of the Stop gas tube 180 at the end of the signal.

Curves L and M relate to the functions of the storing gas tubes SG and, for the sake of clearness, these curves show the variations in control potential and the firing times, respectively, for only the tube SG-I, which stores the selecting pulse I.

The operations of the impulse producing circuit will now be briefly traced.

Upon operation of the receiving relay 120 to spacing at the Start transition the Stop tube 180 is extinguished and the oscillator 130 enters its first negative half cycle. No change takes place in the impulse producing circuit until the time 411 during the positive half cycle when tube 150 becomes conducting. The rise in plate current produces a short negative pulse in the secondary winding of transformer 152 which has no effect.

At instant 413 tube 160 becomes conducting, thereby temporarily shifting the grid potential for amplifying tube 170 through condenser 164 and momentarily rendering tube 170 nonconducting. This causes the transformer 172 to produce a short strong positive impulse, followed by a short weak negative impulse in its secondary winding. The positive impulses produced by transformer 172 in this manner are used for the selective control of the storing gas tubes SG, as will be described hereinafter; since no tube SG is assigned to the Start pulse the impulse produced during the Start pulse will have no effect. Any negative impulse produced by transformer 172 will have no effect.

At instant 414 the tube 160 again becomes nonconducting, thereby temporarily making the grid potential of tube 170 more positive, through condenser 164. The tube 170 is operated on a portion of its characteristic near saturation so that an increase in grid potential will result in a comparatively small increase in plate current. The resultant negative and positive impulses produced at this time in the secondary winding of transformer 172 therefore will have no effect.

At the time 412 the tube 150 is rendered nonconducting thereby producing a positive impulse in the secondary winding of transformer 152 which is utilized for control of the gas tube distributor, as will be described hereinafter.

The operations just described will be repeated during subsequent cycles and under the control of the oscillator, these operations being independent of the incoming pulses and the operations of relay 120. Seven complete similar cycles will be produced in this manner, and exactly at the end of the seventh cycle, which occurs during the Stop pulse, the oscillator is cocked by the refiring of Stop tube 180, as will be described later, and the impulse producing circuit is restored to its normal or waiting condition.

It will thus be seen that an effective impulse is produced by transformer 152 at each standard transition instant for advancement of the distributor circuit, and that other effective impulses are produced by transformer 172 at orientable instants near the middle of the standard selecting pulse periods for control of the storing circuit.

The electronic distributor circuit, as already stated and as shown in Fig. 1, includes seven gas tubes DG. Each tube has associated therewith a resistance R1 and condenser C1 connected to the control anode and a resistance R2 and condenser C2 connected from minus to the cathode; the main electrode is connected over the common resistance 185 to plus. The resistance R1 connects the control anode with the cathode of the preceding tube and the condenser C1 connects the control anode to the impulse conductor 153 from transformer 152.

Still assuming that the system is in stop condition, all the distributor gas tubes DG are non-conducting except the tube DG–Start.

Considering any one of the currentless tubes, such as DG–I full minus potential is applied over resistance R2 to the cathode and plus potential is applied over common resistance 185 to the main anode; condenser C2 is discharged over resistance R2. Full minus potential is applied over resistances R2 and R1 in series to the control anode; condenser C1 is charged from minus over resistances R2 and R1 and the secondary of transformer 152 to ground. Thus the main gap has ample sustaining potential, whereas the control gap has direct minus potential on both sides.

Considering now the current condition in the tube DG–Start, electron current flows from minus over resistance R2. The cathode and main anode, primary winding of transformer 182, common resistance 185 to plus; the potential drops in resistances R2 and 185 reduce the voltage across the main gap to near the sustaining value. Condenser C2 is charged across resistance R2. A biasing plus potential is thus applied to the control anode of tube DG–I through resistance R1–I. The condenser C1–I was previously discharged from its minus potential and has been subsequently recharged from the biasing plus potential and through the secondary of transformer 152 to ground. The circuit remains in this condition until the arrival of the Start pulse.

Upon the arrival of a Start pulse relay 120 operates to its spacing contact, thereby applying negative potential to the conductors 122 and 124. The tube 180 is extinguished and the oscillator circuit 130 is uncocked so that the first cycle of oscillations will operate the tubes 150, 160 and 170 as described above.

The first short plus impulse from transformer 152 is applied to all the condensers C1. This plus potential thus is momentarily added to the biasing plus potential already present on the control anode of the tube DG–I, the total potential being sufficient to fire the control gap, thereby firing the main gap; the plus impulse is deducted from the minus potential on all the other condensers C1 without effect.

The firing potential established at the control anode of DG–I by the short impulse is also applied back over resistance R1–I to the cathode of DG–Start, thereby reducing the potential across the main gap of this tube below the sustaining value and extinguishing the tube; at this time the firing potential is also applied to condenser C2–Start which temporarily charges and thereafter discharges over resistance R2, thereby delaying the restoration of full minus potential to the control anode of tube DG–I, and thus insuring the firing of the main gap in DG–I. When DG–I is fired the drop caused thereby in common resistance 185 aids in reducing the potential across the main gap in DG–Start, thus further insuring the return to non-fired condition of the DG–Start. With DG–I fired the drop in resistance R2–I applies a plus biasing potential to the control anode of tube DG–II for firing of the control gap only in this tube when the next impulse is applied.

It may be noted here that the varister 181 and condenser 183 connected across the primary winding of transformer 182 are provided to reduce the rate of change of current in that winding when the main gap in tube DG–Start is extinguished, the purpose being to prevent the impulse in the secondary winding from firing the control gap of the Stop tube 180 and react upon the oscillatory circuit at this time. However, due to the unilateral characteristics of the varister 181, the suddenly rising current at the time of firing the main gap of DG–Start during the Stop pulse will be forced through the transformer, inducing a potential in the secondary winding high enough to fire tube 180 and cock the oscillator.

In the manner described above, the next short impulse from transformer 152 will fire tube DG–II and extinguish the tube DG–I, and subsequent impulses from transformer 152 will successively fire the tubes DG–III, IV, V and DG–Stop, in each case extinguishing the preceding tube, so that at any time only one tube will be fired and during the time of a complete character code of seven pulses one tube will be fired at any time. The tubes DG will be fired at exactly equal intervals as determined by the short impulses from transformer 152 and the phase relation of the firing relative to the arrival over the circuit L of the front of the Start pulse may be determined by adjustment of the potentiometer 151. The firing in succession of the DG tubes is indicated by curve E in Fig. 4.

The circuit through the main gap of tube DG–Stop may be traced from minus, over resistance R2–Stop, main gap, left winding of relay 190, resistance 185 to plus. Relay 190 is normally operated to its spacing contact by the right-hand biasing winding, and when tube DG–Stop is fired operates to marking, thereby removing minus potential from conductor 192 and applying it to conductor 191 for control of the storing and transfer tubes, as will be described hereinafter. While tube DG–Stop is fired it causes the biasing potential to be applied over conductor 154 and resistance R1–Start to the control anode of tube DG–Start. At the end of the seventh cycle the tube DG–Stop is extinguished and relay 190 is restored to spacing. The timing of these relay operations is indicated by curve F in Fig. 4.

As referred to above, the firing of the tube DG–Start at the end of the seventh cycle causes an impulse to be produced in the secondary winding of the transformer 182 which fires the control gap of Stop tube 180, thereby firing the main gap of this tube and cocking the oscillator 130. The impulse producing circuit and the distributor circuit thus will be restored to normal at the end of the seventh cycle and in time for the arrival of the next Start pulse.

The receiving circuit shown in Fig. 1 further includes five sets of storing gas tubes SG and transfer gas tubes TG, each adapted to store the corresponding selecting pulse and transfer it to the output conductor 100 for use as will be described hereinafter. These tubes are normally in non-conducting condition.

As shown in Fig. 1, the cathode of each storing tube SG is connected to a potentiometer circuit from negative potentiometer 188, over resistances R3, R4, R5 to plus. The control anode of each tube SG is connected to a control potentiometer circuit from minus, over resistances R2, R6, R7, conductor 123, secondary winding of transformer 172, conductor 122 and contacts of relay 120 to plus or minus. The potential across the control gap of each tube SG thus depends on the conditions in the control potentiometer circuit traced above.

In the following description single values will be assumed for the various potentials involved; these figures are given for the sake of illustration of the general principles involved. Other suitable values may be worked out by those skilled in this art without a departure from the invention.

With relay 120 in spacing position the potential at the control anode of the SG tubes would be full minus (or about −40 volts); with relay 120 in marking position the potential at the control anode would be more positive (being changed by about +20 volts). With the cathodes of tubes SG at −40 volts the potential across the control gap would be zero for spacing, and for marking condition it would be about 20 volts.

With one of the distributor tubes DG–I to V in conducting condition the plus biasing potential due to the drop (20 volts) in resistance R2 will be superimposed upon the already established potential in the associated control potentiometer, rendering it more positive (by about 20 volts).

These conditions are represented by curve L of Figure 4 as applied particularly to the storing tube SG–I for storing of the selecting pulse I. As shown by this curve the potential across the control gap is normally determined by the marking position of relay 120 (20 volts). After the Start transition the potential reduces to zero. At transition I the tube DG–I is fired (see curve E) and the resulting biasing potential raises the control gap potential (to 20 volts). When relay 120 goes to marking (delayed) the control gap potential is further increased (to 40 volts). When tube DG–I is extinguished at transition II the potential is reduced (to 20 volts) and remains at this value except while relay 120 goes to spacing, as during the pulses IV and V which are being assumed to be spacing pulses, when the potential becomes zero.

Thus it will be apparent that the tube SG–I is specially conditioned by the firing of tube DG–I, and that the control potential on the tube SG–I is further increased at this time (from 20 volts to 40 volts) if relay 120 is in marking position. With the firing potential assumed to be about 70 volts the tube still remains currentless. The firing potential is indicated on curve L, Fig. 4, by a dot-dash line "SG–firing."

Since the transformer 172 is included in all the control potentiometer circuits for the SG tubes it is evident that the impulses produced by the transformer at about the center of each cycle will make all the SG control anodes more positive (by 40 volts). Only the SG tube which is in a conditioned state can be fired by the impulse, and only during a marking pulse. Thus, as shown by curve L, three conditions of positive potential add up during the impulse from transformer 172 to exceed (by 10 volts) the firing potential of tube SG–I. If, as indicated by dotted line curve portions in curves A and L, the pulse I had been spacing, the potential across the control gap during the impulse would have been insufficient (60 volts) to start the tube SG–I.

Thus any one of the SG tubes may be started during a marking pulse provided the tube is conditioned by the distributor. The firing of the control gap automatically switches to the main gap, where the main anode is connected over resistance R8 to plus. The tube remains fired until the Stop pulse. These conditions are indicated for tube SG–I by curve M in Fig. 4.

Inasmuch as the biasing potential from any particular distributor tube DG contributes to the building up of the potential on the control anode of the associated SG tube, the further change toward positive of the biasing potential due to an impulse from transformer 152 at the end of the cycle will increase the control potential on the SG tube. To again consider tube SG–I, with this tube already fired the impulse would have no effect. With the tube currentless during a spacing pulse I and with the impulse from transformer 152 of a voltage not in excess of that from transformer 172 (40 volts) the combined potential applied across the control gap of tube SG–I at the end of the cycle would be insufficient to fire the tube.

Considering the particular condition of a marking pulse arriving early, it will for the sake of example be assumed that pulse I is spacing, tube DG–I is fired and tube SG–I is conditioned but not fired (control gap potential 20 volts). Shortly before instant II the relay 120 operates to marking, bringing the control gap potential on SG–I closer to firing value (40 volts). At instant II the impulse from transformer 152 is added to the control potential. Therefore, in order to prevent untimely firing of SG–I the voltage (20 volts) of this impulse must be appreciably less than that from transformer 172 (40 volts), so that the SG tube may be adjusted to discriminate between them. The firing potential of the SG tubes may be adjusted at potentiometer 188; if necessary a potentiometer 188 may be provided for each SG tube, to make the firing potential independent of the load from the fired tubes.

The operations of relay 120 also react to some extent through resistances R6 and R7 upon the biasing potential established by a fired DG tube for the succeeding DG tube. The change in biasing potential due to this cause should be appreciably less than the voltage of the impulse from transformer 152 to insure that the next DG tube will be fired by the impulse while relay 120 is in spacing, and also to prevent the conditioned tube from firing if relay 120 should go to marking. The biasing potential normally applied to tube DG–I while the tube DG–Start is fired is of course independent of relay 120 (the drop in resistance R2–Start will still be assumed to be about 20 volts). When the impulse from transformer 152 (20 volts) arrives the sum of the two potentials (40 volts) exceeds the firing potential (30 volts) for the control gap; tube DG–I is fired and DG–II is conditioned. The biasing potential applied to tube DG–II is, however, made up of the drop in resistance R2 (20 volts) with the plus or minus potential from relay 120 superimposed thereon. In the case of a spacing pulse the biasing potential would be reduced (to about 15 volts, more positive than full minus) and in the case of a marking pulse it would be increased (to about 25 volts), the resultant potential in either case should be insufficient to fire tube DG–II. With the impulse (20 volts) added from transformer 152, either of the resultant potentials (increased to 35 and 45 volts, respectively), should be sufficient to fire tube DG–II.

In the manner described above, an incoming signal may be stored on the storing gas tubes SG, any one tube being fired during a corresponding marking pulse at the proper time, as controlled by the distributor tubes DG, and the remaining tubes being left currentless. Thus, for the assumed signal the tubes SG–I, II, III will be fired and tubes SG–IV, V will be extinguished.

Each of the five transfer tubes TG has its control anode connected to the potentiometer R3, R4, R5, and its cathode is connected over conductor 191 and normally open marking contact of relay 190. The potential across the control gap, when relay 190 goes to marking position and connects negative to conductor 191, will normally be too low for firing of the TG tube. However, when the associated SG tube is fired the consequent drop over resistance R3 will drive the control anode of tube TG enough toward positive to permit firing. Thus, when relay 190 operates to marking, as tube DG–Stop is fired, any TG tube which is connected to a fired SG tube will have its control gap fired.

The main anode of each TG tube is connected through conductor 100 and resistor R11 to a potential of +130 volts. Thus, the arc in the fired tubes will automatically switch to the main gap, thereby establishing an operating current over each conductor 100 associated with a received marking pulse.

The firing of the TG control gap tends to immediately increase the drop over resistance R5; however, the charge on condenser C3 assures complete firing of the main gap by temporarily maintaining the potential across the control gap. When the main gap is fired the main gap potential reduces to the sustaining value (about 32 volts), due to the resistance included in the circuit from conductor 100 as will be described hereinafter. Due to the charges on condensers C4 and C5 the potentials on the TG control anode and on the SG main anode will temporarily be driven more toward negative thereby extinguishing these two gaps. Thus, the storing tubes, which were fired, are extinguished at the beginning of the Stop pulse. After the passing of the seventh cycle the tube DG–Stop is extinguished and relay 190 returns to spacing position, thereby extinguishing the TG tubes and conductors 100 will be restored to their normal potential.

With the tube DG–Start fired and the oscillator 130 cocked the entire receiving circuit is restored to normal ready for the next Start pulse, having passed a marking current over conductors 100–I, II, III to the associated circuit, and no current over conductors 100–IV, V.

It will be noted from the description given above that the tubes TG responding to a spacing pulse will apply full plus potential to the output conductors and responding to a marking pulse will apply a reduced plus potential to the output conductors during the Stop pulse. However, for the purpose of establishing the reverse condition in output conductors from the distributor circuit in Fig. 1, a set of transfer vacuum tubes TV is provided, having a set of output conductors 101. Each vacuum tube TV has its control grid connected to an intermediate point of the potentiometer R9, R10, R11, connected from minus to plus, and normally the potential applied to the grid is high enough to cause a flow of plate current from plus through the resistance R12 and the cathode-anode path of the tube to ground, thereby establishing a potential drop in resistance R12. Thus, under normal conditions the output conductors 101 will be at a potential lower than the plus potential.

Again, assuming that the storing tubes SG–I, II, III will be fired and that the tubes SG–IV, V will be extinguished at the time the Stop pulse arrives and operates relay 190 to marking, the corresponding TG tubes will be fired and extinguished, respectively. Thus, considering the code unit I, the current flow in the resistance R11 will be increased thereby driving the grid potential of tube TV–I less positive. The tube becomes currentless, thereby eliminating the drop in resistance R12 so that full plus potential will be applied to conductor 101–I. In the case of the code unit IV the TG tube will not be fired so that the tube TV–IV will continue to carry plate current and to maintain the reduced plus potential on output conductor 101–IV.

In this manner the TV tubes responding to a marking condition will apply high plus potential to the output conductors and those responding to spacing will apply a reduced plus potential to the output conductors during the Stop pulse. This mode of operation is particularly suitable for the circuit arrangement shown in Fig. 2, as will now be described.

Figures 2, 3, 5:
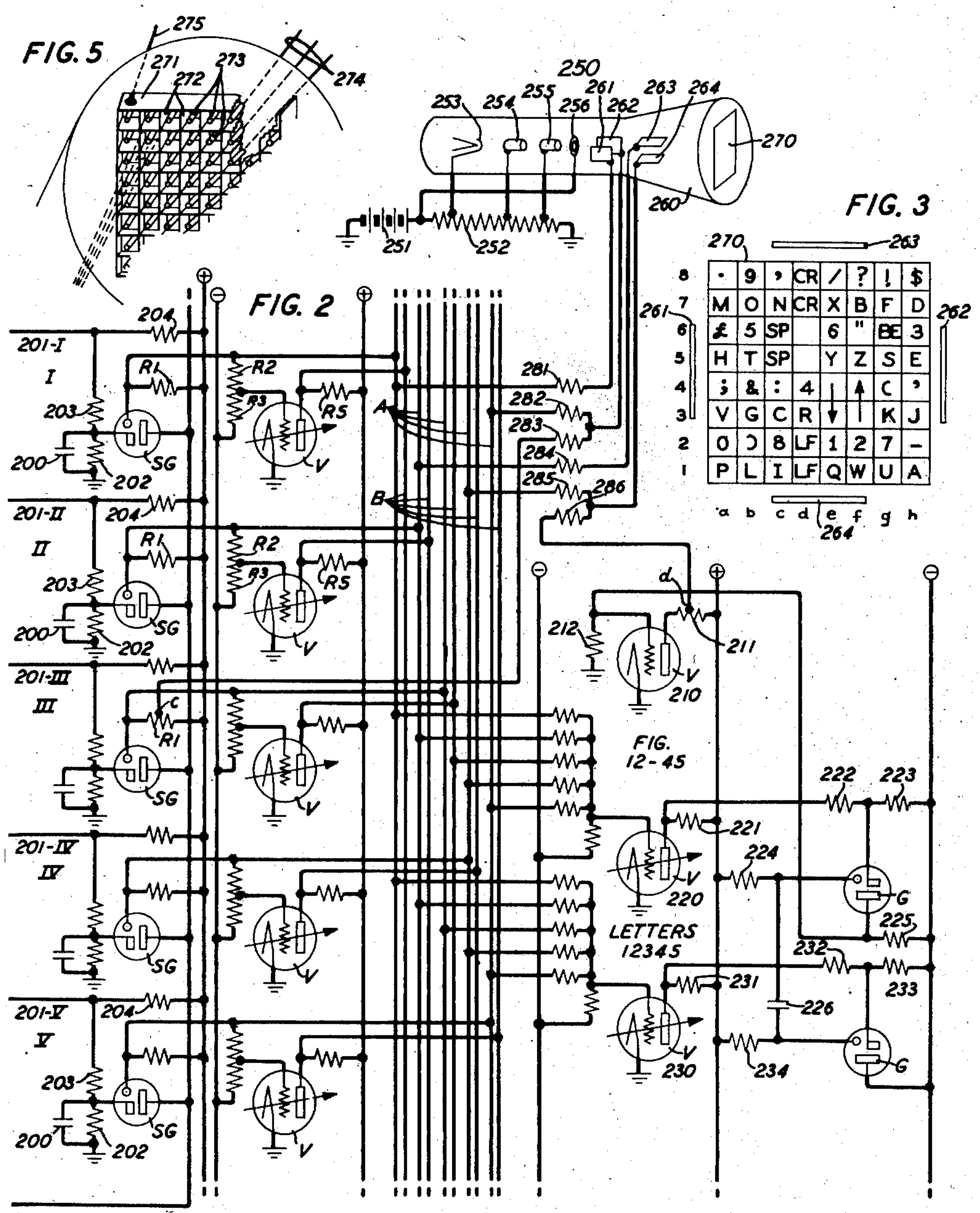
Fig. 2 shows a decoding circuit having five input conductors adapted for connection to the output conductors of Fig. 1 and arranged for translation of a telegraph message into symbols made visible by means of a cathode ray tube.
Fig. 3 shows diagrammatically a field of letters, numerals and signs which may be arranged on the reading surface of the cathode ray tube in Fig. 2 for visible display of the symbols of a message.
Fig. 5 is a fragmentary perspective view of the cathode ray tube showing an alternative arrangement of the reading surface with electrodes instead of symbols.

The decoding circuit shown in Fig. 2 is at least in part based upon the principles of the circuit shown in Fig. 1 of Patent 2,458,030 granted January 4, 1949, to W. T. Rea. Thus, the circuit of Fig. 2 includes five code unit or inverter circuits I, II, III, IV and V connected over pairs of conductors A and B to two code discriminating circuits 220 and 230 responsive particularly to the codes for Fig and Letters, respectively. The system, as shown, also includes a translating arrangement connected to the conductors A and terminating in the deflecting plates of a cathode ray tube 250 for selective deflection of the beam in accordance with each incoming code and for display of the corresponding symbol. This circuit is also adapted for operation with the distributor circuit shown in Fig. 1.

Each of the inverter circuits I to V thus includes a vacuum tube V and resistances R1, R2, R3 and R5 connected to plus and minus potential and to a pair of conductors A and B, substantially as shown in Fig. 1 of the copending application hereinbefore identified. For the control of each inverter circuit, current control means, such as a storing gas tube SG is provided, which during the seventh cycle will respond to the condition imposed upon its input conductor 201 by the corresponding transfer vacuum tube TV in Fig. 1 over a conductor 101. When the tube SG in Fig. 2 is non-conducting the tube V will be conducting and the conductor A will have high potential and the conductor B will have low potential.

The control anode of tube SG is connected to a point of the potentiometer circuit formed by resistances 202, 203 and 204 connected between ground and plus, and thus has a positive potential applied thereto (of 30–40 volts); under this condition the condenser 200 is charged to the same potential. The cathode is connected over the conductor 192 and over the normally closed spacing contact of relay 190 to minus.

Assuming the circuit as shown in Fig. 2, to be in the condition prevailing during the seventh cycle, when relay 190 is operated to marking thereby disconnecting minus from the cathodes of the SG tubes, these tubes will all be extinguished. Further assuming that the pulse I is marking and that consequently the transfer tube TV–I in Fig. 1 is non-conducting during the seventh cycle, then the potential on the condenser 200–I and on the control anode of tube SG–I will be sufficient for firing of the tube when at the end of the seventh cycle relay 190 again applies minus to the cathode. The condenser 200 will retain a sufficient charge during the travel time of relay 190 to assume proper firing of the tube. As a result the main gap is fired over resistance R1–I to plus, which cuts off tube V–I and causes the inversion of the potentials on the conductors A–I and B–I. The tube SG–I will remain fired until the next seventh cycle, thus storing the marking condition until the Stop pulse of the succeeding signal.

Further assuming that the pulse II is spacing, the tube TV–II in Fig. 1 will be conducting during the seventh cycle, in which case the potential on condenser 200–II and the control anode of tube SG–II will be low and insufficient to fire the tube, when relay 190 returns to spacing and completes the cathode circuit to minus. The conductors A–II and B–II thus retain their normal potentials undisturbed.

Similar functions take place in all the code unit circuits I to V depending upon the marking and spacing condition of the corresponding pulses of the code signal, so that the potentials on the conductors A and B will be correspondingly disposed and will retain such disposition of potentials during the reception of the succeeding signal until the Stop signal thereof.

The cathode ray tube 250 may be of conventional type and includes the usual elements, such as cathodes 253 and elements 254, 255 and 256 for projecting and focusing the beam, these elements being connected to suitable potentials on potentiometer 252 connected to the source of direct current 251. A pair of horizontal positioning or deflecting plates 261 and 262 and a pair of vertical positioning or deflecting plates 263 and 264 are arranged for deflecting the beam horizontally and vertically, respectively, in accordance with marginal potentials impressed upon these plates through resistances 281, 282, 283, 284, 285 and 286 by the code responsive circuit. The tube elements are enclosed in a sealed vessel 260, usually of glass, containing an inert gas at low pressure. The enlarged end of the tube 260 is coated with a suitable material adapted to be activated by the beam for luminous display of the beam spot. The reading surface thus provided has a display screen 270 incorporated therein containing the upper and lower case symbols represented by the code, these symbols being arranged in horizontal and vertical lines, as shown more in detail in Fig. 3. The object is to deflect the floating beam in accordance with each incoming code signal to strike a corresponding symbol on the screen 270 and thereby make the symbol visible or optically effective for recording. The screen may be placed in any convenient manner to either produce a shadow of a symbol on an illuminated background outlined by the beam or to produce an illuminated symbol on a dark background. The beam will be at rest on a selected symbol at least during the first six cycles of operation of the circuit in Fig. 2 and the luminous material in the screen 270 may have sufficient persistence of luminosity to permit the reading of successive symbols by the eye, even at the speed of normal teletypewriter operation.

The field of symbols, shown in Fig. 3 includes a plurality of horizontal rows 1 to 8 and vertical rows *a* to *h*. The Letters are disposed in the odd numbered rows and the Figs in the even numbered rows. Other arrangements of the two cases may however be provided. The deflecting plates 261, 262, 263 and 264 are indicated in this diagram in their relation to the rows. The adjustments in the circuit are such that the beam will be focused on the vacant space 5,*d* in response to an all spacing code, for which condition all the deflecting plates receive high potential. The vacant space may, of course, be differently chosen, if desired.

The plate 261 is connected through resistance 281 to the conductor A–1 and thus will have high plus potential for a spacing pulse I and low plus potential for a marking pulse I. The change from high to low potential will cause the beam to be deflected four spaces to the right from any position it may happen to occupy.

The plate 262 is connected through resistance 282 to conductor A–V and through resistance 283 to a point *c* on resistance R1–III. Thus for a marking pulse III the point *c* on resistance R1 will be at an intermediate potential and for a spacing pulse III the point *c* will be at high plus potential. For a marking pulse V the resistance 282 will receive low plus potential and for a spacing plus V resistance 282 will receive high plus potential. The combination of these potentials applied to resistances 282 and 283 will variously affect the potential applied to the plate 262. Thus with both resistance 282 and 283 receiving high potential for spacing plus III and V there will be no effect on the beam. With high potential on resistance 282 and low on resistance 283, half of the difference will be applied to plate 262, causing the beam to move two spaces to the left. With intermediate potential on resistance 283 and high potential on resistance 282, only half of the difference between these potentials will be applied to plate 262, causing the beam to move one space to the left. With intermediate potential on resistance 283 and low potential on resistance 282 the beam will move three spaces to the left. This general principle of potential division may, of course, be extended to include control of plate 262 by one or more additional code units, either within the five-unit code or in a code with six or more units.

The plate 263 is connected over resistance 284 to the conductor A–II to receive high potential for a spacing pulse II and low potential for a marking pulse II. The change from high to low potential will move the beam four spaces down.

The plate 264 is connected through resistances 285 and 286 to receive combination potentials from the conductor A–IV and from the point *d* on resistance 211 in the circuit 210. As will be explained hereinafter, the tube V–210 will be in spacing condition, that is, non-conducting when the Letters condition is established and in marking or conducting condition when the Fig condition is established. The point *d* thus will be at high plus potential for Letters and at intermediate potential for Fig. Thus with low potential on resistance 285 for a marking pulse IV and high potential on resistance 286 for Letters the beam will move up two spaces. With Letters changed to Fig there would be an intermediate potential on resistance 286 which with low potential on resistance 285 will move the beam up three spaces. With a spacing pulse IV and Fig the high potential on resistance 285 and intermediate potential on resistance 286 will move the beam up one space.

Thus for the sake of example, it will be assumed that the beam is focused on the space 5,*d* for an all spacing code. For the first signal having the code 1----, the beam will move to the space 5,*h* displaying the corresponding symbol "E." For the next signal having the code 12---, the beam moves four spaces down, showing the corresponding symbol "A." For the next code 123--, the beam moves one space left, showing the symbol "U." For the next code 1234-, the beam moves two spaces up, showing the symbol "K." For the next code being 12345, the beam moves to the space 3,*e* corresponding to "Letters."

In a similar manner the operations for any other code combinations may be traced.

Generally speaking a reduction in potential on a plate in the cathode ray tube equal to the full difference between high and low plus potential will deflect the beam four spaces away from the plate. When the reduction in potential is applied through a pair of resistances, such as 282 and 283 or 285 and 286, the deflection will be only two spaces away from the plate. When the reduction is further divided as by the resistance 283 being connected to the mid-point of resistance R1 or as in the case of resistance 286 being connected to the mid-point of resistance 211, then the beam will be deflected only one space away from the plate.

It should be understood that the shifting of the beam over 1, 2 and 4 spaces in different combinations by a pair of plates may be accomplished by applying corresponding potentials to one of the plates and maintaining a constant potential on the other plate, or that these three selective actions may be apportioned between the two plates of a pair in any manner, the starting point of the beam being changed accordingly.

It will thus appear that with two pairs of positioning elements arranged in quadrature about the floating beam and with suitable use of potential dividers as described herein to supply the required marginal positioning force, a single tube may be used for selective action in response to codes of more than five units. Thus with a code of $n$ units, the field may contain $2^n$ spaces. Of these, $2^m$ spaces may be selected in response to $m$ units of the code applied to one pair of plates, and the remaining $2^{n-m}$ spaces may be selected in response to $n-m$ units applied to the other pair.

It will be noted that the operations traced above result in the display of symbols only in odd numbered horizontal lines in which the letters are displayed. In order that the symbols in the even numbered rows, viz., the figures, may be displayed by corresponding codes it will be necessary to temporarily shift the beam upward one space. This will be accomplished by the transmission before the symbol of the code 12-45 for Fig which will be received in the circuit 220 where the tube 220V would become non-conducting. When this happens the potential applied from the potentiometer of resistances 221, 222, 223 to the control anode of the associated gas-filled tube G will be made sufficiently positive to fire the control gap and consequently fire the main gap of this tube. The current in the main gap flows from minus over resistance 225, main gap, resistance 224 to plus. Resistance 225 being included in a potentiometer circuit with resistance 212. The potential drop therein makes the grid potential in the tube V-210 more positive, thus rendering the tube conducting; the consequent drop in resistance 211 will decrease the plus potential applied over resistance 286 to the plate 264 which thus will shift the beam upward one space. The tube G-220 will remain fired during subsequent signals; thus upon the reception of the code for Fig all subsequently received codes will cause the beam to display the corresponding symbol in any of the even numbered rows.

When at any time thereafter the code for Letters is received the tube V-230 will be rendered non-conducting, thereby firing the tube G-230 in the same manner as explained for the tube G-220. Resistors 231, 232 and 233 have the same relation to tubes V-230 and G-230 that resistors 221, 222 and 223 have to tubes V-220 and G-220. The condenser 226 having been charged by the potential drop in resistance 224 since the firing of the tube G-220, its potential at the time of firing of tube G-230 drives the potential on the main anode of tube G-220 to a value less than the sustaining potential thereby extinguishing the tube G-220. As as result the tube V-210 is again rendered non-conducting, thereby increasing the plus potential on plate 264 and lowering the beam one space for subsequent display of symbols in the odd numbered rows.

The gas tubes G-220 and G-230 are mutually extinguishing through the condenser 226 which will be charged alternately across the resistances 224 and 234.

It should be understood that the gas tube G-220 and the vacuum tube V-210 may be arranged as tubes SG-VI and V-VI for direct response to a sixth code unit, in which case the Letters circuit 230, of course, would be unnecessary.

It should furthermore be understood that the positioning plates in the cathode-ray tube may be connected to the B conductors instead of the A conductors for each code unit, or that some of the connections may be made to the A conductors and the others to the B conductors, with corresponding relocation of the symbols on the display screen 270.

The system, as shown in Fig. 2, may, of course, be used for selecting other circuits, besides the circuits 220 and 230, in response to other code combinations. Thus, a circuit may be provided which will operate an audible signal in response to Fig-S in accordance with general practice.

The cathode-ray tube 250 may be readily adapted for circuit selection instead of for decoding into visible symbols. For this purpose the field of letters 270, shown more in detail in Fig. 3, should be replaced by a field of separate circuit elements mounted on the end surface of the tube and connected for selective control of corresponding circuits in response to contact with the floating beam. The energization of individual circuits by the beam for the duration of a signal may be accomplished by different means. Reference may be had to United States Patent 2,057,773, issued to Finch on October 20, 1936, which in Fig. 1 shows single contact elements transmitting impulses into separate circuits by direct contact with the beam. In the United States Patent 2,195,098, issued to Skellett on March 26, 1940, a similar but intensified action is secured by secondary ionization between double contact elements under impingement by the beam. Any well-known means may be used to establish a time margin in each circuit to insure positive control during the exposure time, and to exclude control while the beam travels between positions during the stop pulse.

A diagrammatic showing of such an arrangement is given in Fig. 5. Only a portion of the field of contacts or electrodes is shown. The common electrode 271 provides a plurality of compartments 272 arranged in rows similar to those shown in Fig. 3. Within each compartment an individual electrode 273 is mounted and is connected through the tube wall to an external circuit. Each compartment and its electrode is aligned with the direction of the beam so that when struck the space between them will be ionized and cause a current to flow between the common conductor 275 and the individual conductor selected.

For number checking or identification on a 10-digit basis, the tube may have 10×10 targets selectable by a 7-unit permutation code. With two such tubes in cooperation, 10,000 numbers could be checked or selected by two 7-unit codes.

What is claimed is:

1. A permutation code signal responsive system comprising a plurality of code responsive circuit means, one for each unit of the code, and each having an output terminal, a cathode ray tube for translation of the incoming signals and including a first and a second plate for deflecting the beam horizontally and a third and fourth plate for deflecting the beam vertically, each of said plates being connected to a corresponding one of said output terminals, each of said receiving circuit means being adapted to establish at its output terminal two different potentials relative to the beam potential in response to the alternate conditions of its assigned code unit for effecting two different deflections of the beam.

2. A permutation code signal responsive system comprising a plurality of code responsive circuit means, one for each unit of the code, and each having an output terminal, a cathode ray tube for translation of the incoming signals and including a first and a second plate for deflecting the beam horizontally and a third and a fourth plate for deflecting the beam vertically, each of said plates being connected to a corresponding one of said output terminals, each of said receiving circuit means being adapted to establish at its output terminal two different potentials relative to the beam potential in response to the alternate conditions of its assigned code unit for effecting two different deflections of the beam and one of said plates also being connected to another one of said terminals for superimposition of the voltages at the said two terminals for effecting still another different deflection of the beam.

3. A decoding system comprising first voltage control means having an output terminal and being responsive to a first unit of the code to supply two different voltages to said terminal in response to the alternate characteristics of the unit, second voltage control means similar to said first voltage control means for similarly supplying voltages to its terminal, third voltage control means similar to said first voltage control means for similarly supplying two different voltages to its terminal at least one of which is different from the corresponding voltage of said first voltage control means, and a cathode ray tube having a first plate connected to said first voltage control means for deflecting the beam to two different positions in response to said different voltages and a second plate connected to said second and third voltage control means for deflecting the beam to four different positions in response to the combined said different voltages.

4. A translating system for a permutation code including $2^n$ permutations of code units having two alternate characteristics comprising a translating device having floating selecting means and four positioning means arranged in quadrature about said floating selecting means for selective positioning thereof in a field of $2^n$ spaces for selective action, said system further comprising control circuit means having $n$ code responsive means each adapted to apply high and low positioning forces to one of said positioning means in accordance with the alternate characteristics of the assigned code unit, $m$ of said responsive means being assigned to one opposed pair of said positioning means and $n-m$ of said responsive means being assigned to the other opposed pair.

5. A translating system for a permutation code including $2^n$ permutations of code units having two alternate characteristics comprising a translating device having floating selecting means and four positioning means arranged in quadrature about said floating selecting means for selective positioning thereof in a field of $2^n$ spaces for selective action, said system further comprising control circuit means having $n$ code responsive means each adapted to apply high and low positioning forces to one of said positioning means in accordance with the alternate characteristics of the assigned code unit, $m$ of said responsive means being assigned to apply marginal forces to one opposed pair of said positioning means to position said selecting means selectively in any one of $2^m$ positions and $n-m$ of said responsive means being assigned to apply marginal forces to the other opposed pair to position said selecting means selectively in any one of $2^{n-m}$ positions.

6. A translating system for a permutation code including $2^n$ permutations of code units having two alternate characteristics comprising a translating device having floating selecting means and four positioning means arranged in quadrature about said floating selecting means for selective positioning thereof in a field of $2^n$ spaces for selective action, said system further comprising control circuit means having $n$ code responsive means each adapted to apply high and low positioning forces to one of said positioning means in accordance with the alternate characteristics of the assigned code unit, said code responsive means being adapted to produce equal high potentials and equal low potentials for the application of said high and low positioning forces, and said control circuit means further including potential dividing means connected to receive high and low potentials from said code responsive means for proportioning of some of said high and low forces to effect $2^n$ combinations of forces.

7. A translating system for a permutation code including $2^n$ permutations of code units having two alternate characteristics comprising a translating device having floating selecting means and four positioning means arranged in quadrature about said floating selecting means for selective positioning thereof in a field of $2^n$ spaces for selective action, said system further comprising control circuit means having $n$ code responsive means each adapted to apply high and low positioning forces to one of said positioning means in accordance with the alternate characteristics of the assigned code unit, said responsive means being adapted to produce equal high potentials and equal low potentials for the application of said high and low positioning forces and said control circuit means further including potential dividing means connected to receive said equal high and low potentials for proportioning of some of said high and low forces to effect $2^m$ combinations of forces applied to one opposed pair of said positioning means and to effect $2^{m-n}$ combinations of forces applied to the other opposed pair for the positioning of said selecting means in any one of said $2^n$ spaces.

8. A translating system for a permutation code including $2^n$ permutations of code units having two alternate characteristics comprising a cathode ray tube having two pairs of juxtaposed plates for positioning of the beam in a field of $2^{n+1}$ spaces for selective action, control circuit means for said tube including $n$ code responsive means each adapted to apply high and low positioning potentials to one of said plates in accordance with the alternate characteristics of the assigned code unit for positioning of the beam in $2^n$ spaces of said field, a code discriminating circuit having a receiving branch connected to each of said code responsive means for combining said high and low potentials into a single discriminating potential varying to represent the different incoming code combinations and selective means connected to receive said single potential and responsive to a predetermined value of said single potential representing a predetermined code combination to alternately apply high and low positioning potentials to one of said plates to cause the beam to be subsequently positioned by said code responsive means alternately in one and the other of the $2^n$ spaces.

9. A translating system for a permutation code including $2^n$ permutations of code units having two alternate characteristics comprising a cathode ray tube having two pairs of juxtaposed plates for positioning of the beam in a field of $2^{n+1}$ spaces for selective action, control circuit means for said tube including $n$ code responsive means each adapted to produce high and low potentials in accordance with the alternate characteristics of the corresponding code unit and potential dividing means connected between at least two of said code responsive means to produce intermediate potentials in accordance with the alternate characteristics of the corresponding code units, two code discriminating circuits each having a receiving branch connected to receive high and low potentials from each of said code responsive means in accordance with the code requirements for the assigned symbol, said receiving branches in each being interconnected to combine said potentials into a single discriminating potential varying as the different code combinations are received, each of said discriminating circuits further having selective means connected to be selectively responsive to a predetermined value of said varying potential representing the assigned symbol for selective action, storing means for producing high and low potentials and connected to be responsive to the selective actions of said two selective means, alternately, to alternately produce said high and low potentials, and potential dividing means connected between said storing means and at least one of said code responsive means to produce intermediate potentials in accordance with the alternate characteristics of the corresponding code unit and the alternate code combinations of the said two assigned symbols, said two pairs of plates being connected to receive said high, intermediate and low potentials for positioning of said beam in any space in said field.

10. A translating system in accordance with claim 9 in which said tube has $2^{n+1}$ electrodes distributed in said $2^{n+1}$ spaces each adapted to produce a current flow in an associated circuit when selectively engaged by the beam.

11. In a decoding system for a permutation code having $n$ code units, $n$ pairs of receiving circuits having high and low potentials of the same polarity and responsive to the code units to interchange said high and low potentials within each pair, a cathode ray tube having a pair of horizontal and a pair of vertical beam positioning means, and a plurality of potential dividers connected to said receiving circuits to apply one or the other of said potentials to said positioning means and to apply varying potentials intermediate said high and low potentials to said positioning means for positioning of the beam into $2^n$ distinctly different positions in response to the different code permutations.

12. A translating system for permutation code signals comprising a cathode ray tube having a pair of opposed plates for positioning of the beam in a field of spaces for selective action, code responsive means for each code unit for establishing simultaneous high and low potentials in accordance with the alternate characteristics of the assigned code unit, a decoding circuit having a receiving branch connected to each of said code responsive means for combining said high and low potentials into a single discriminatory potential representing the different incoming code combinations, and selective means connected to receive said single potential and responsive to a predetermined value thereof to alternately apply high and low potentials to one of said plates for correspondingly varying the position of the beam.

13. In a translating system for permutation codes, a selector mechanism comprising a plurality of selector devices equal in number to the selecting elements of the code and each conditionable in accordance with either of two selecting conditions of said elements, a cathode ray tube having pairs of deflecting electrodes disposed in quadrature, connections from said selector devices to said deflecting plates for impressing on said plates combinations of electrical potentials to cause the deflection of the cathode beam to any one of a plurality of positions equal to the selecting capabilities of the code, and decoding means connected to said selector devices and effective in response to a particular code combination for superimposing upon one of said pairs of plates an electrical potential which, in combination with said other electrical potentials, causes the deflection of said beam to any one of a like plurality of other positions.

14. In a translating system for permutation codes, a selector mechanism comprising a plurality of selector devices equal in number to the selecting elements of the code and each conditionable in accordance with either of two selecting conditions of said elements, a cathode ray tube having pairs of deflecting electrodes disposed in quadrature, connections from said selector devices to said deflecting plates for impressing on said plates combinations of electrical potentials to cause the deflection of the cathode beam to any one of a plurality of positions equal to the selecting capabilities of the code, and decoding means connected to said selector devices and effective in response to a particular code combination for superimposing upon one of said pairs of plates an electrical potential which, in combination with said other electrical potentials, causes the deflection of said beam a fixed distance from any one of said positions to a corresponding one of a like plurality of other positions.

15. In a translating system for permutation codes, a selector mechanism comprising a plurality of selector devices equal in number to the selecting elements of the code and each conditionable in accordance with either of two selecting conditions of said elements, a cathode ray tube having pairs of deflecting electrodes disposed in quadrature, connections from said selector devices to said deflecting plates for impressing on said plates combinations of electrical potentials to cause the deflection of the cathode beam to any one of a plurality of positions equal to the selecting capabilities of the code, means for superimposing upon one of said pairs of plates either of two electrical potentials which, in combination with said other electrical potentials, causes the deflection of said beam to any one of said positions or to any one of a like plurality of other positions, and decoding means individually responsive to two particular code signals for causing said two electrical potentials to be produced.

16. In a translating system for permutation codes, a selector mechanism comprising a plurality of selector devices equal in number to the selecting elements of the code and each conditionable in accordance with either of two selecting conditions of said elements, a cathode ray tube having pairs of deflecting electrodes disposed in quadrature, connections from said selector devices to said deflecting plates for impressing on said plates combinations of electrical potentials to cause the deflection of the cathode beam to any one of a plurality of positions in any one of a plurality of rows, decoding means connected to said selector devices and effective in response to a particular code combination for superimposing upon one of said pairs of plates an electrical potential which, in combination with said other electrical potentials, causes the deflection of said beam to any one of a plurality of positions in any one of a plurality of other rows alternating with said first-mentioned rows.

WILTON T. REA.

References Cited in the file of this patent

UNITED STATES PATENTS

| Number | Name | Date |
|---|---|---|
| 1,587,122 | Harlow | June 1, 1926 |
| 1,917,294 | Carr | July 11, 1933 |
| 2,132,213 | Locke | Oct. 4, 1938 |
| 2,267,827 | Hubbard | Dec. 30, 1941 |
| 2,283,383 | McNaney | May 19, 1942 |
| 2,361,766 | Hadekel | Oct. 31, 1944 |
| 2,442,702 | Marrison | June 1, 1948 |

FOREIGN PATENTS

| Number | Country | Date |
|---|---|---|
| 567,451 | Great Britain | Feb. 14, 1945 |